US006271876B1

(12) United States Patent
McIntyre et al.

(10) Patent No.: US 6,271,876 B1
(45) Date of Patent: *Aug. 7, 2001

(54) USING TWO DIFFERENT CAPTURE MEDIA TO MAKE STEREO IMAGES OF A SCENE

(75) Inventors: Dale F. McIntyre, Honeoye Falls; John A. Weldy, Rochester, both of NY (US); Jennifer C. Loveridge, North Harrow (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/851,736

(22) Filed: May 6, 1997

(51) Int. Cl.$^7$ .................................................. H04N 13/00
(52) U.S. Cl. ................................................ 348/46; 348/64
(58) Field of Search .................................. 348/42, 43, 44, 348/45, 46, 47, 48, 49, 50, 52, 64

(56) References Cited

U.S. PATENT DOCUMENTS

| 4,131,919 | * | 12/1978 | Lloyd et al. | 386/117 |
|---|---|---|---|---|
| 4,989,078 | | 1/1991 | Paxton . | |
| 5,130,745 | | 7/1992 | Cloutier et al. . | |
| 5,406,394 | * | 4/1995 | Numakura et al. | 358/518 |
| 5,420,705 | * | 5/1995 | Ray | 358/523 |
| 5,450,149 | | 9/1995 | Cocca . | |
| 5,502,528 | | 3/1996 | Czarnecki et al. . | |
| 5,687,412 | * | 11/1997 | McIntyre | 348/64 |
| 5,706,416 | * | 1/1998 | Mann et al. | 345/427 |
| 5,752,111 | * | 5/1998 | Morton | 396/324 |
| 5,815,645 | * | 9/1998 | Fredlund et al. | 358/450 |
| 5,903,303 | * | 5/1999 | Fukushima et al. | 348/47 |
| 5,946,509 | * | 8/1999 | Morton | 396/311 |
| 5,982,416 | * | 11/1999 | Ishii et al. | 348/29 |
| 5,982,941 | * | 11/1999 | Loveridge et al. | 382/260 |
| 5,986,671 | * | 11/1999 | Fredlund et al. | 345/435 |
| 6,014,165 | * | 1/2000 | McIntyre et al. | 348/64 |

OTHER PUBLICATIONS

W.K. Pratt, Digital Processing, pp. 50–93, Wiley Interscience 1978.

Image Processing, edited by D. Pearson, Chapter 3, "Motion and Motion Estimation," G. Thomas, pp. 40–57, McGraw–Hill, 1991.

Chapter 3 of "Theory and Application of Digital Signal Processing," Rabiner & Gold, Prentice–Hall, 1975.

* cited by examiner

Primary Examiner—Wendy R. Garber
Assistant Examiner—Jacqueline Wilson
(74) Attorney, Agent, or Firm—Raymond L. Owens (57) ABSTRACT

A method of making a stereo image of a scene. The method includes capturing and digitizing a first image of the scene in a first image capture medium and capturing and digitizing a second image of the same scene but from a displaced position from which the first and second image was captured on a second different image capture medium. The method further includes producing visual images of the first and second captured digital images which, to a viewer, provides a stereo image of the scene.

1 Claim, 9 Drawing Sheets

USING TWO DIFFERENT CAPTURE MEDIA TO MAKE STEREO IMAGES OF A SCENE

CROSS REFERENCE TO RELATED APPLICATIONS

The present invention is related to U.S. patent application Ser. No. 08/672,390 filed May 29, 1996 now abandoned, entitled "A Camera for Recording Images on a Photographic Film or on Magnetic Tape" to McIntyre et al; U.S. patent application Ser. No. 08/738,389 filed Oct. 25, 1996 U.S. Pat. No. 5,687,412 now abandoned, entitled "Camera for Selectively Recording Images Recorded on a Photographic Film on a Magnetic Tape" to McIntyre et al; and U.S. patent application Ser. No. 08/796,349 filed Feb. 7, 1997 now abandoned, entitled "Apparatus and Method of Producing Digital Image With Improved Performance Characteristic" to McIntyre et al; U.S. patent application Ser. No. 08/781,676 filed Jan. 10, 1997 U.S. Pat. No. 5,809,356 now abandoned, entitled "Apparatus and Method for Recording on Separate Film Frames Right and Left Picture-Taking Positions of Single-Lens Camera for Stereoscopic Photography" to Lungershausen et al; and U.S. patent application Ser. No. 08/637,116, Apr. 24, 1996 U.S. Pat. No. 5,797,051 now abandoned, entitled "A Non-Photographic Strip Having a Base Layer Similar to a Photographic Filmstrip and a Magnetic Recording Layer" to McIntyre et al, assigned to the assignee of the present invention. The disclosure of these related applications are incorporated herein by reference.

FIELD OF THE INVENTION

The present invention relates to the field of stereoscopic photography, and in particular to a method of making stereo images of a subject.

BACKGROUND OF THE INVENTION

A stereo camera typically has a pair of matched taking lenses designed to take, simultaneously, two pictures of the same scene. When displayed through a suitable stereo viewing device, the two images are simultaneously observed to produce a perceived three-dimensional representation of the scene.

The desired spacing from two different viewpoints requires that the images be spaced by the same distance on a roll of film. In order to maximize the number of images on a roller film, for example, a 35 mM roll of film, the images are typically exposed in an interleaved fashion. Even with this efficient interleaving approach, not all of the useable film is used, thus limiting the number of exposures that can be made on a roll of film. The constraint of image spacing (74 mM) and image interleaving, coupled with the desire to achieve good image quality, results in a film image size that is smaller in size (24 mM height×22 mM width) and is in a vertical or portrait format. As most scenes better lend themselves to a horizontal or landscape format, the aspect ratio of stereo images is often not esthetically pleasing. It should be noted that stereo cameras cannot be rotated since the line of the two lenses must be parallel to the ground to achieve the desired stereo effect.

The problem of image spacing has been overcome by utilizing a non-film stereo recording device such as disclosed in commonly assigned U.S. Pat. No. 4,989,078 to Paxton wherein a compact still video camera with two sensors is used to capture spaced images of the same scene. However, the image quality of still video cameras is low compared to film cameras.

SUMMARY OF THE INVENTION

It is an object of the present invention to provide stereo images which eliminate the above mentioned problems such as aspect ratio, number of shots per roll, and display stereo image quality.

This object is achieved in a method of making a stereo image of a scene, comprising the steps of:
a) capturing and digitizing a first image of the scene in a first image capture medium;
b) capturing and digitizing a second image of the same scene but from a displaced position from which the first and second image was captured on a second different image capture medium; and
c) producing visual images of the first and second captured digital images which, to a viewer, provides a stereo image of the scene.

ADVANTAGES

In addition to overcoming the above mentioned problems, the present invention, by capturing two different images on two different media, utilizes the benefits of both capture media. For example, by using a hybrid camera with film capturing one view and an electronic sensor capturing the other view, the electronic image capture can be used as an instant preview. This preview of the scene can then be used to make subsequent decisions such as should this be a stereo scene upon display? Does the image need re-taken due to an unacceptable composition or other problems?

DETAILED DESCRIPTION OF THE INVENTION

Figure 1:
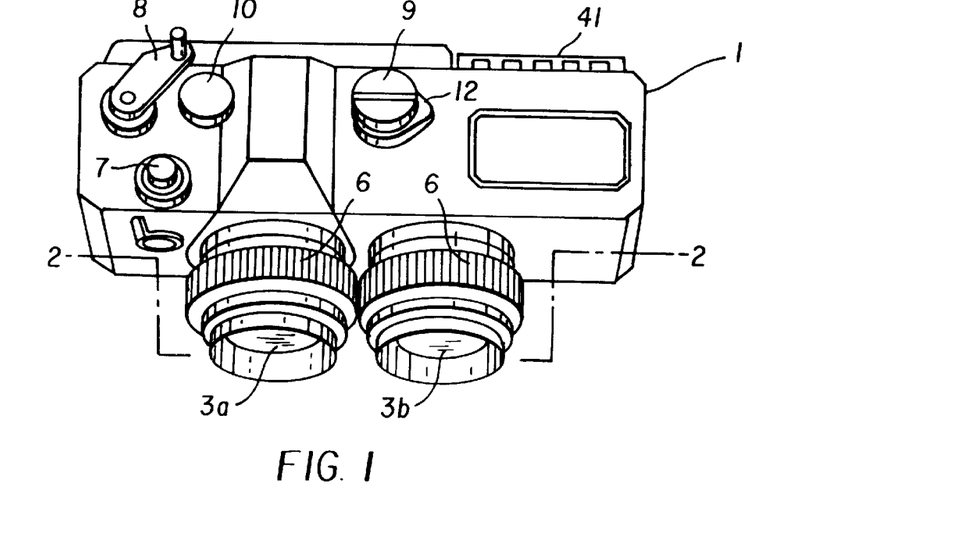
FIG. 1 is a perspective view of a hybrid dual lens camera in accordance with the present invention.

The term hybrid camera refers to an image capturing means that utilizes at least two separate imaging capture media such as photographic film and an electronic image sensor to capture a scene. Turning now to FIG. 1, there is shown a hybrid dual lens camera having a hybrid camera main body 1; imaging lenses 3a and 3b; focusing mechanisms 6; a shutter switch including a self-return push-button switch 7; a wind-up lever 8; a shutter speed dial 9; a film rewind knob 10; and a film sensitivity dial 12. These components are the same as those in a normal camera.

Figure 2:
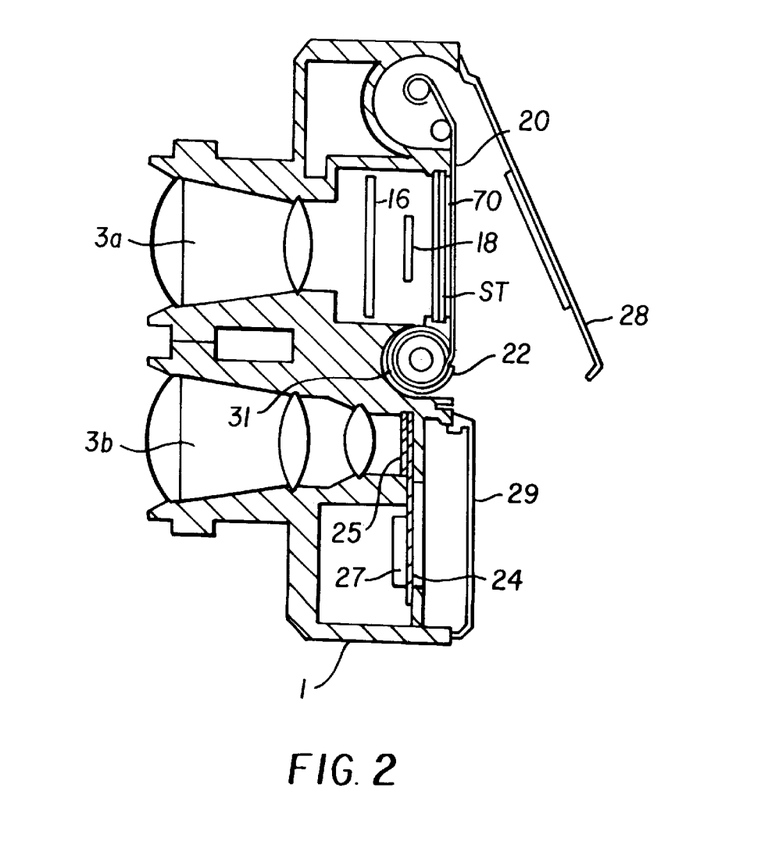
FIG. 2 is a cross sectional view of the camera shown in FIG. 1 taken along the lines 2—2.

Turning now to FIG. 2 which is a cross sectional view which depicts a hybrid camera which includes a through the lens (TTL) automatic exposure function (not shown), and has a normal structure including a reflex mirror 16, submirror 18, shutter curtain ST, film 20 disposed in a film cartridge 22. The film cartridge 22 is removable from the camera body and a new film cartridge 22, having substantially the same design as the film cartridge, can be inserted into the camera body. This new cartridge includes a magnetic tape. When this cartridge is used, a linear magnetic head array 36 (see FIG. 3) is activated.

As is well known in the art, the substrate of the film 20 can have on its rear side, coated a transparent magnetic layer. Another magnetic head 38 (see FIG. 3), which is under the control of head interface electronics 40 (see FIGS. 4a and 4b), can be used to read and write information to the transparent magnetic storage layer. The head interface electronics 40 provides signals to either the linear magnetic head array 36 or magnetic head 38 in a conventional manner. Although two separate arrangements will be described for the linear magnetic head array 36 and the magnetic head 38, those skilled in the art will appreciate that a single magnetic head unit can be used to provide the functions of these heads. Magnetic head 38 typically includes two tracks which correspond to tracks C1 and C2 on the film 20. This arrangement will be discussed later in connection with FIG. 4b. For a more complete disclosure see, for example, commonly assigned U.S. Pat. No. 5,130,745, the disclosure of which is incorporated by reference.

The hybrid camera main body includes an electronic image sensor 25 arranged to coincide with the axis of the imaging lens 3b, and is electrically connected to a semiconductor chip 27 mounted on a printed circuit board 26. In this embodiment, respective rear covers 28 and 29 for the film and electronic portion of the hybrid camera are independently provided. As is well understood, a cartridge receiving structure 31 is provided within the hybrid camera main body 1 and, in accordance with the present invention, can receive a cartridge which has either photographic film or magnetic tape.

In accordance with the present invention, images are taken simultaneously on two different media: photographic film and electronic image sensor 25. Although these two images are of the same scene, they are taken from different positions, and as will be described later, can be used in generating an improved stereo image. Typically, the photographic image, which will be digitized, has a higher scene spatial resolution than that of the electronic image sensor 25. These two images are digitally processed to provide a single improved output stereo image, as will be described.

Figure 3:
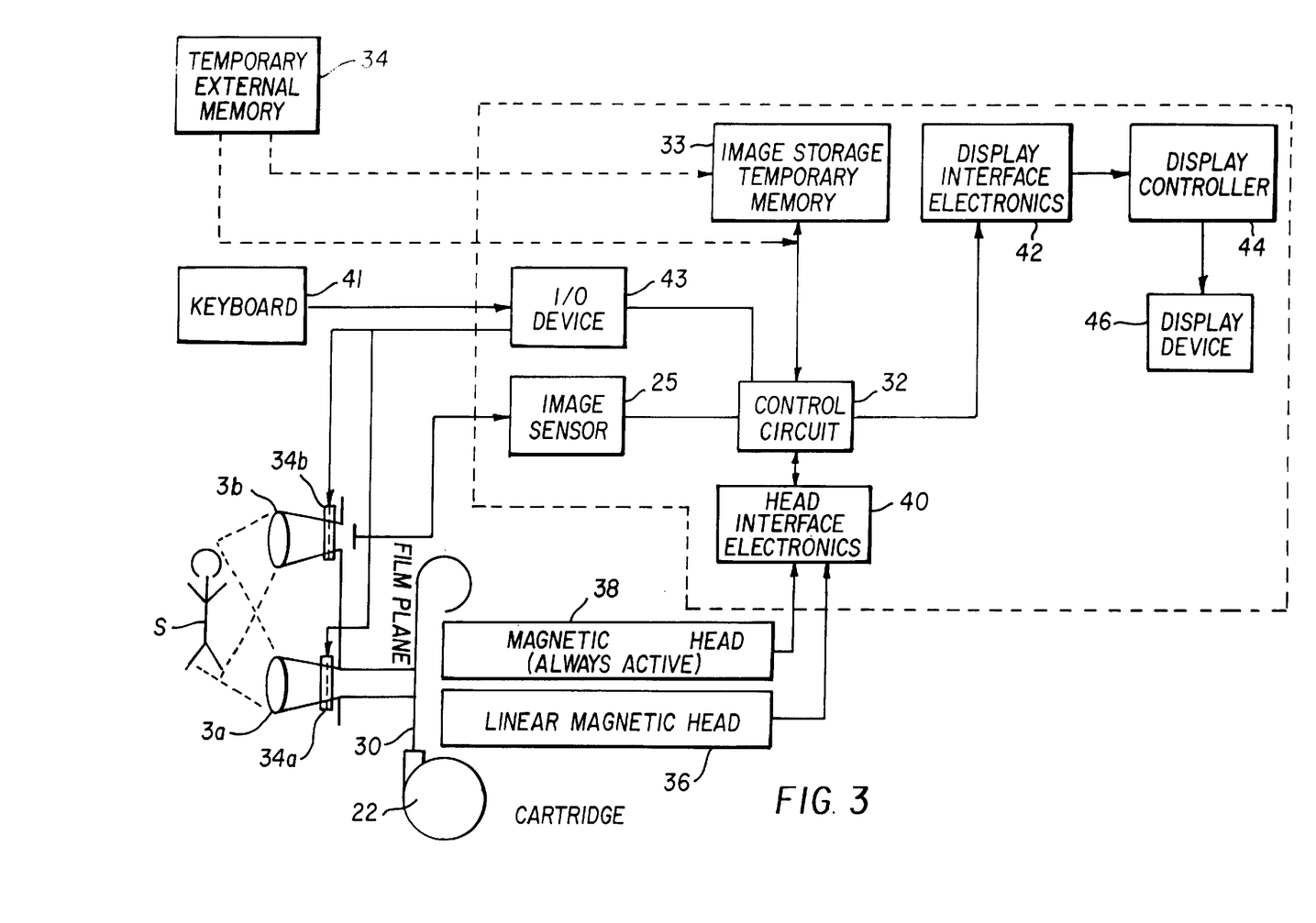
FIG. 3 is a block diagram of various elements of the hybrid camera system shown in FIG. 1.

In FIG. 3, a block diagram is shown of various systems within the hybrid camera main body 1. As shown, a subject S is positioned in front of the camera lenses 3a and 3b. An image of the subject is focused by the camera lens 3a onto the film 20 supplied by film cartridge 22 on a photographic film plane 30 by the camera lens 3a of the film cartridge 22 which contains photographic film or magnetic tape. An image of the subject S is also by the camera lens 3b and other optical elements (not shown) upon the electronic image sensor 25. Electronic image sensor 25 can be a full frame charge coupled device (CCD) or, alternatively, can be an interline device with, for example, photodiode pixels which are adapted to deliver charge to interline CCDs. Conventional electronic circuitry (not shown) is associated with the electronic image sensor 25. After the electronic image sensor 25 receives light representative of the image of the subject S, the circuitry sets up, acquires, and transfers electronic signals from the electronic image sensor to circuitry for digitization and image processing for forming a stereo image. Such electronics are well known in the art and their description omitted for clarity of discussion. A control circuit 32 is adapted to transfer images from an image storage temporary memory 33 to display interface electronics 42. The display interface electronics 42 causes digital images to be delivered to a display controller 44 which, in turn, causes selected images to be shown on a display device 46. It will be understood that the image shown on a display device is not a stereo image since it is not a combination of two digitized images. In operation, the image on the display first displays the captured image by the image sensor 25. After this image is viewed, a viewer then can make the decision as to whether a stereo image is desirable. At that point since both images have been recorded, they then can be processed as discussed in the specification. The display device can, for example, be a liquid crystal display device 46. When the image storage temporary memory 33 is fully loaded, the control circuit 32 signals to the display interface electronics 42 an appropriate signal causing the display controller 44 to display information on the display device 46 indicating to the user that the image storage temporary memory 33 is full. The user then, via the keyboard 41, makes a decision whether to transfer the images in the display interface electronics 42 or to rewind the film cartridge 22 and insert a film cartridge 22 containing magnetic tape. The arrangement of such type of a display structure is well known in the art and used on many commercially available cameras such as the Casio QV-10 digital still camera. In operation, shutter mechanisms 34a and 34b (shown schematically as dotted lines) of the hybrid camera are simultaneously operated and images of the subject S are directed to the photographic film plane 30 for recording on the photographic film and onto the electronic image sensor 25. The operation of the shutters is as best shown in FIG. 3 under the control of an input/output device 43 such that when a magnetic cartridge is loaded into the camera, the shutter mechanism 34a is disabled and prevents light from the subject from illuminating the photographic film plane 30. The linear magnetic head array 36 detects the presence of a prerecorded signal on the magnetic tape. The image storage temporary memory 33 may include transistors that can store a number of images as is well known to those skilled in the art. Each time an image is to be photographed on the film, a corresponding image is stored in image storage temporary memory 33. Another temporary external memory 34 is shown which is external to the camera itself and can either receive or deliver signals directly under the control of the control circuit 32. Of course, the images stored in image storage temporary memory 33 and the photographic images which will be digitized will be used to produce stereo image.

The linear magnetic head array 36 is under the control of the head interface electronics 40. In accordance with the present invention, after a film cartridge 22 having a magnetic tape is inserted into the camera, the magnetic head 38 detects the presence of a film cartridge 22 having magnetic tape and provides a signal to the head interface electronics 40 that a magnetic tape is now in the camera. Under the control of a user, the keyboard 41 mounted on the camera body as shown in FIG. 1 sends signals through input/output device 43 into control circuit 32 which causes data representing images to be selectively transferred to the head interface electronics 40 which, in turn, control the writing of such image data via the linear magnetic head array 36. The keyboard 41 can also be mounted external to the camera.

More particularly, the keyboard 41 signals the control circuit 32 to transfer selected images from the image storage temporary memory 33 through the control circuit 32 and the head interface electronics 40 to the linear magnetic head array 36. The linear magnetic head array 36 records such images onto magnetic tape.

The output of the hybrid camera main body 1 is photographic film images and images of the same scenes captured at different positions by the electronic image sensor 25 and subsequently recorded onto magnetic tape. These two media are then used to produce improved stereo images. More particularly, corresponding images from the magnetic tape and digitized images from the photographic film are combined and processed as will be described later.

Figure 4A:
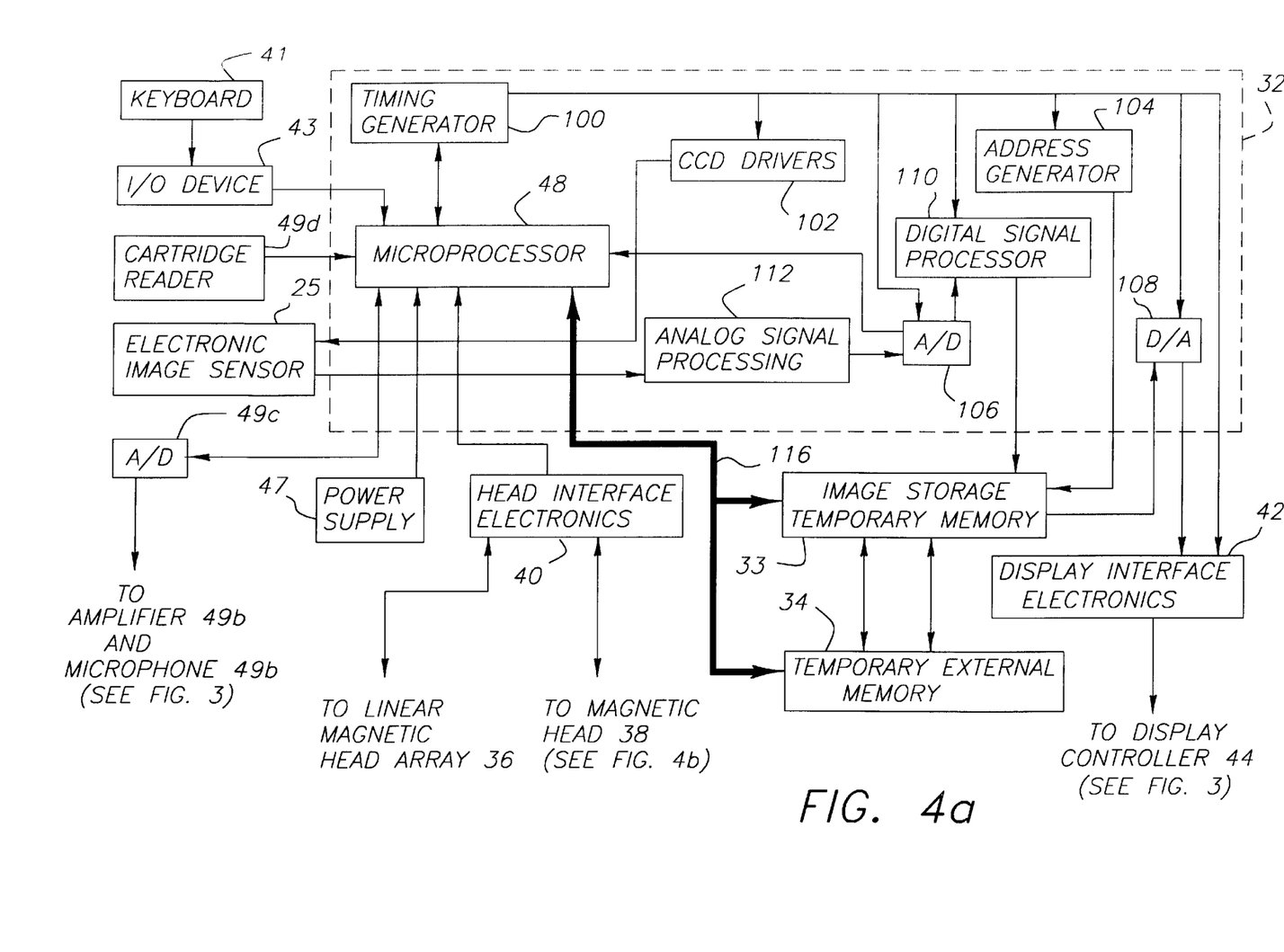
FIG. 4a and FIG. 4b perspectively show block diagrams of the control circuit 32 and the head interface electrodes.

Turning now to FIG. 4a, where a more detailed block diagram is shown of control circuit 32. The control circuit 32 is shown to receive inputs from input/output device 43, which is under the control of keyboard 41. Also shown external to the control circuit 32 are the head interface electronics 40, temporary external memory 34, and display interface electronics 42, all previously discussed with reference to FIG. 3. Moreover, a power supply 47 is shown to provide power to a microprocessor 48. The microprocessor 48 receives an input from the input/output device 43 and provides control signals to a timing generator 100. The timing generator 100 controls CCD drivers 102, an address generator 104, signal processing circuitry 110, and also provides signals to an analog-to-digital converter 106 and to display interface electronics 42, as well as to a digital-to-analog converter 108. The CCD drivers control the electronic image sensor 25 which, in turn, provides analog signals to analog signal processing circuitry 112. The analog signal processing circuitry 112 delivers signals to the analog-to-digital converter 106 delivers digital signals to digital signal processing circuitry 110. The digital signal processing circuitry 110 provides an input to image storage temporary memory 33. The address generator 104 causes digital information to be delivered either to the temporary external memory 34 or to the digital-to-analog converter 108. The digital-to-analog converter 108, under the control of the timing generator 100, provides input signals to the display interface electronics 42. In response to signals from timing generator 100, the display interface electronics 42 delivers non-stereo image signals to the display interface electronics 42 shown in FIG. 3.

Figure 4B:
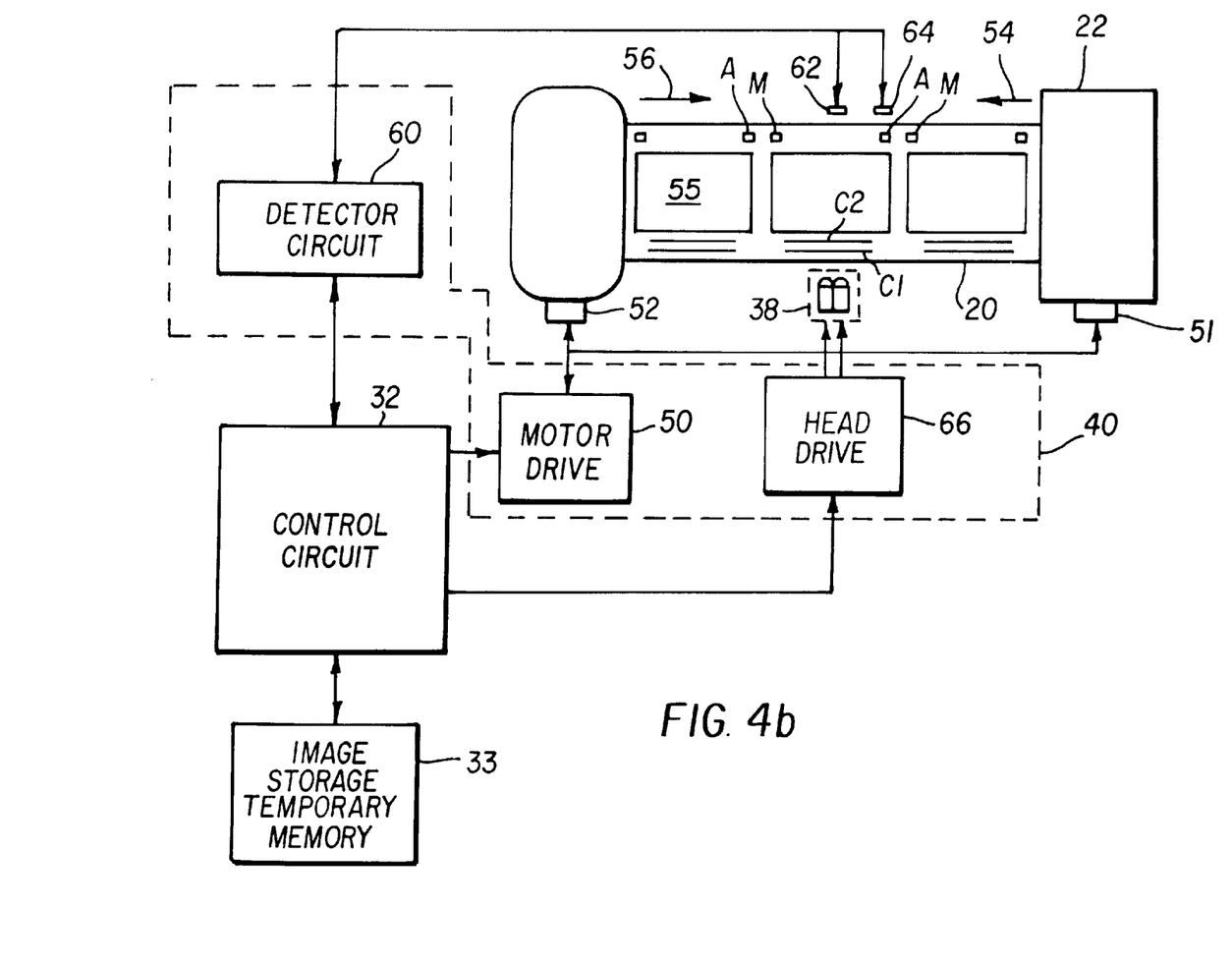

Turning now to FIG. 4b, where a more detailed block diagram shows the head interface electronics 40. In FIG. 4b, portions of the hybrid camera main body 1 associated with magnetic recording of data on film in accordance with the present invention are shown. The control circuit 32, as discussed above, controls various functions of the camera operation. Other data, such as date, time, exposure information, scene orientation, and frame format can be provided in a well known manner within control circuit 32. Image storage temporary memory 33, which can be provided by an EEPROM stores image data prior to writing it to a magnetic tape. A motor drive 50 is mechanically coupled to an internal spool 51 of the film cartridge 22 and to a take-up spool 52. The detail construction of the spools 51 and 52 are conventional. The motor drive 50 is operated under the control of the microprocessor 48 of control circuit 32 advances the film 20 in a first direction represented by arrow 54 from the film cartridge 22 to the take-up spool 52, frame by frame, after each image frame 55 is exposed. Once all frames are exposed, motor drive 50 is operative to rewind the film in a second direction represented by arrow 56 from the take-up spool 52 to the film cartridge 22 in one continuous motion. A detector circuit 60 is coupled between control circuit 32 and opto-sensors 62 and 64 to sense apertures A and M to control frame by frame advance of the film and recording data in tracks C1 and C2. In conjunction with detector circuit 60 and control circuit 32, opto-sensor 64 serves as a metering sensor responsive to detection of metering perf M to position image frame 55 properly within the camera exposure gate (not shown). Opto-sensor 64 serves as a velocity sensor responsive to detection of anticipation perf A to sense the velocity of the film as it is being transported. Data recording in parallel longitudinal data tracks C1 and C2 is accomplished by means of magnetic head 38 driven by head drive 66 under the control of the microprocessor 48 of the control circuit 32. The details of film 20 and the magnetic recording layer thereon are fully described in aforementioned U.S. Pat. No. 5,130,745, the disclosure of which is incorporated herein by reference. For a more complete disclosure of the operation of magnetic head 38, see commonly assigned U.S. Pat. No. 5,450,149 issued Sep. 12, 1995 to Cocca entitled "Photographic Camera and Method for Recording Magnetic Data on Film", the disclosure which is incorporated herein by reference. For a more complete discussion of the film rail and gate frame structure located in hybrid camera main body 1, see U.S. Pat. No. 5,502,528, the disclosure of which is incorporated herein by reference. For a more complete description of the magnetic tape, which can be used in the present invention, see the above-identified commonly assigned U.S. patent application Ser. No. 08/672,390 filed May 29, 1996. It will be understood to include a high density ferromagnetic structure such as found in conventional video or audio tape cassettes. For an example of such a structure, see commonly assigned U.S. patent application Ser. No. 08/637,116, filed Apr. 24, 1996.

The leading edge of the magnetic tape is thrust forward from a tape supply side of film cartridge 22 which includes the internal spool 51 to the take-up side of the camera which includes take-up spool 52. The spools are under the control of the driver motor 50 which, in turn, is controlled by the microprocessor 48 within the control circuit 32.

It will be understood that, once information has been recorded in the magnetic tape, tape movement induces a change in the flux in the head gaps that causes information to be exchanged as is well known in the art. Thus, it should be clear that the linear magnetic head array 36 can operate in both a record and playback mode. The linear magnetic head array 36 provides recording signals but also is adapted to receive signals in a playback mode. As shown in FIG. 4a, in the playback mode, the head interface electronics 40 delivers data to the microprocessor 48. Thereafter, the microprocessor 48 delivers data bus 116 to either the image storage temporary memory 33 or to temporary external memory 34 for further processing as discussed above.

In operation, after a number of images have been recorded on a photographic film, an operator can operate the keyboard 41 and disable the shutter mechanisms 34a and 34b and cause the motor drive 50 to rewind the exposed film into internal spool 51 of film cartridge 22. Film cartridge 22 can now be removed from the camera and another film cartridge 22 with magnetic tape can be inserted into the camera or, alternatively, another cartridge containing photographic film can also be inserted into the cartridge receiving structure 31. In the event that an operator does not have photographic film available the operator, of course, can insert a film cartridge 22 containing a magnetic tape into the camera and record directly onto such tape.

Figures 5, 5A:
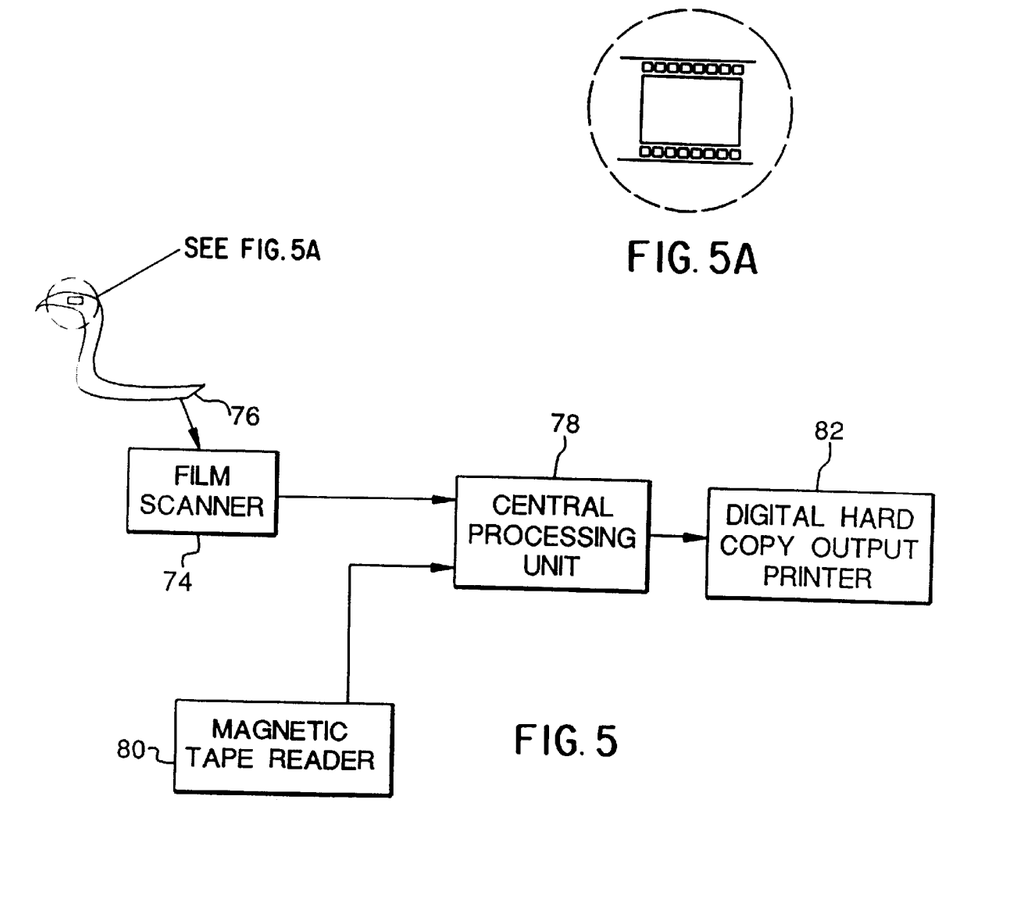
FIG. 5 is a block diagram showing a scanner for digitizing images on a photographic film and for applying such digital signals to a processing unit and a magnetic tape reader for applying corresponding stored images to the central processing unit; the central processing unit processes the images in accordance with the present invention.

Turning now to FIG. 5, a block diagram is shown having a film scanner 74 for digitizing images from a photographic film 76 produced by the hybrid camera main body 1. An example of a commercially available film scanner is RFS2035 film scanner manufactured by the Eastman Kodak Company. The film scanner 74 produces digital images of photographic images and delivers them to a central processing unit 78. The photographic film can be either a negative or a positive film. A magnetic tape reader 80 reads the digital images stored on the tape and applies these images to the central processing unit 78. Stored within the film and the magnetic images on the tape are identification numbers so that the computer can numerically correlate the images for the same scene when it performs subsequent image processing. After the computer has processed the images in accordance with present invention, it produces output signals to a digital hard copy output printer 82 or a stereo display device. Digital hard copy output printers are well known in the art and can take forms as ink jet printers, thermal printers, or the like. The output of the digital hard copy printers are two images which, when viewed together as discussed above, produce a stereo output when viewed through standard stereo means which are well understood in the art.

Figure 6A:
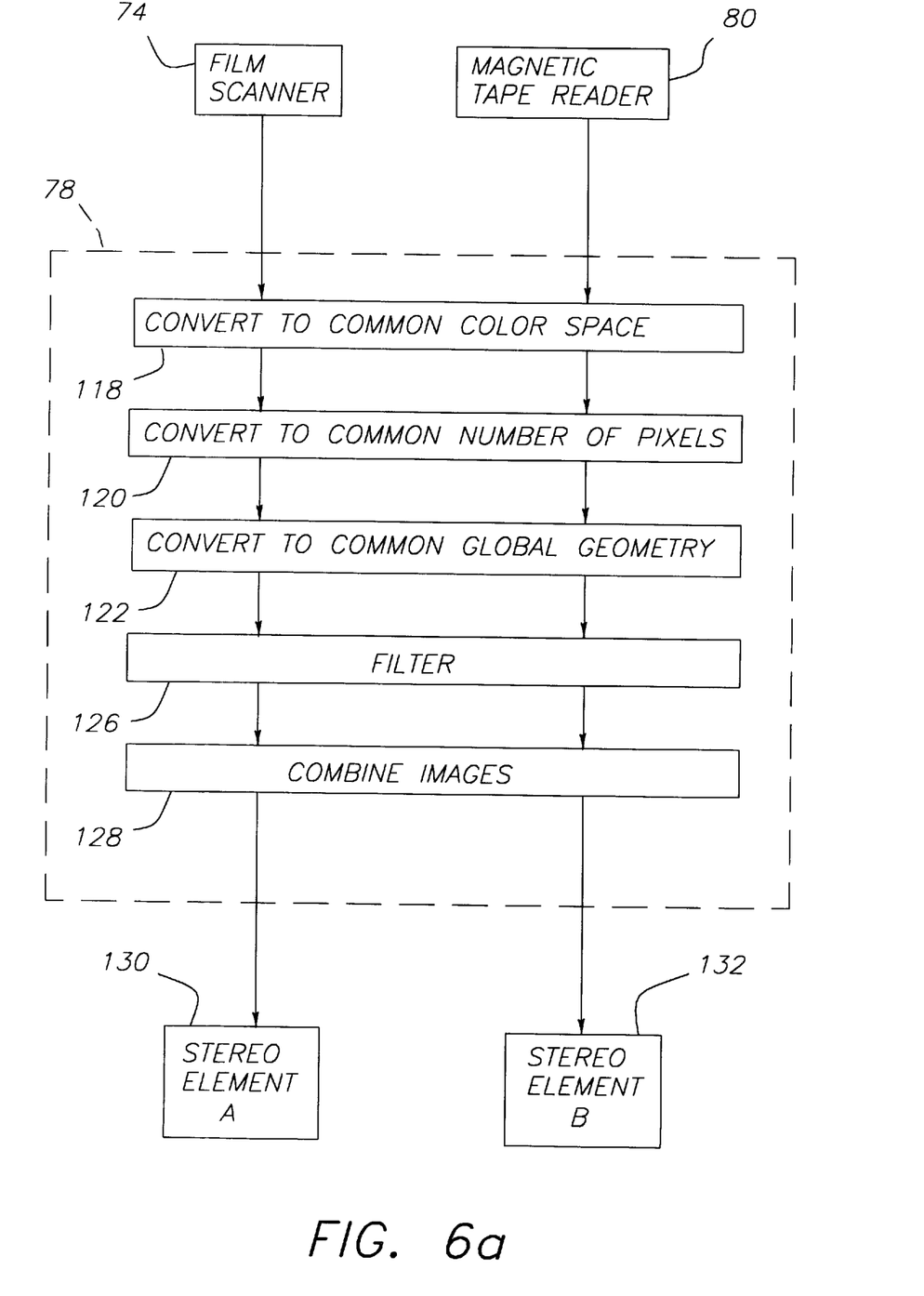
FIGS. 6a, 6b, 6c, and 6d are flow charts showing in block diagram form the steps needed for the combining and image processing.

Turning now to FIG. 6*a* which is a block diagram showing the steps for producing a digital stereo image. First, the film image is scanned and digitized by film scanner 74 and applied to the central processing unit 78. In addition, the digitized electronic image is read by magnetic tape reader 80 and also applied to the central processing unit 78. Although this algorithm is embodied in the central processing unit 78, it will be understood that the algorithm can be stored on a computer program product such as, for example, magnetic storage media, such as magnetic discs (floppy disc) or magnetic tapes; optical storage media such as optical discs, optical tape, or machine readable barcode; solid state storage devices such as random access memory (RAM) or read only memory (ROM).

The next step, in block 118, is to convert both of these same scene digitized images to a common color space. Although both images are digital representations of the same scene, the two capture systems, that is the film and the electronic image sensor, typically have different color reproduction characteristics, hence the color information will be apportioned differently among the color channels in the two systems. Both images should be transformed into a common color space with a common tone-scale, by means of color matrices and look-up tables (see, for example, W. K. Pratt, Digital Processing, pp 50–93, Wiley Interscience 1978), or by means of 3-D LUTs, techniques which are well known to those skilled in the art. After the images are converted to a common color space, they will be combined and a new digital image produced which is stereoscopic.

In block 120 the number of pixels in each of these converted images must be substantially matched in number of pixels. In other words, there should be a common number of pixels. It will be understood that the number of pixels in the scanned photographic image is typically much higher than from the electronic image sensor. In order to provide this conversion to a common number of pixels, the image with the lower number of pixels is upsampled by, for example, the method of bi-cubic interpolation to match the number of pixels in the other image. Other types of interpolation techniques can also be used to upsample digitized images, such as spatial function fitting, convolution, and Fourier domain filtering. These are well known in the art, and described, for example, in W. K. Pratt, pp 113–116.

In block 122, corrections are now made to the digital images to correct for any difference in their global geometry, that is any geometrical transformation which, when applied to every pixel in one image, enables its geometry to be substantially mapped onto the geometry of the other. Examples of such transformations are translation, rotation, scaling, aspect ratio, and the geometrical effects of the different lens systems that are used for the photographic film and the electronic image sensor. It will be understood that this correction need be applied to only one of the images to enable it to be mapped onto the geometry of the other, and since there may be some slight loss in image quality, sharpness in particular, associated with the application of this correction, the correction would normally be applied to whichever of the digital images originally had fewer pixels at block 120. The correction will typically involve three steps. First is the generation of a set of displacement vectors, typically with sub-pixel accuracy, which characterize a local x,y displacement between the two images at certain locations in the image-pair. A variety of techniques may be suitable, including block matching, and the method of differentials, both well known in the art (Image Processing, edited by D. Pearson, Chapter 3, "Motion and Motion Estimation," G. Thomas, pp 40–57, McGraw-Hill, 1991), but the preferred technique for this application is Phase Correlation. For a more complete disclosure of phase correlation techniques, see Pearson ibid and commonly assigned U.S. patent application Ser. No. 08/334,985, filed Nov. 7, 1994, the disclosure which is incorporated by reference herein. Phase-correlation provides a method to generate displacement vectors which is robust in the presence of noise and brightness changes in the record of the scene. The second step is the interpretation of that set of displacement vectors as a generalized geometrical transformation. Three commonly occurring transformations are described here, translation, magnification (zoom) and rotation in the plane of the image, but it will be understood that a similar process can be used to interpret all geometrical transformations of rigid bodies. In the case of translation, the transformation is defined, simply, as that x,y displacement which occurs most frequently in the set of displacement vectors. Otherwise, if two independent translation vectors are available from the vector set which map positions $(x_1,y_1)$ and $(x_2,y_2)$ in one image onto $(x_1',y_1')$ and $(x_2',y_2')$ respectively in the second image, then the following transformation may be defined:

Magnification, by a factor m (m≠1), about an origin at (a, b), is defined as $$\begin{bmatrix} m & 0 \\ 0 & m \end{bmatrix} \begin{bmatrix} x_i - a \\ y_i - b \end{bmatrix} + \begin{bmatrix} a \\ b \end{bmatrix} = \begin{bmatrix} x_i' \\ y_i' \end{bmatrix}$$

Hence, substituting the pair of translation vectors and rearranging yields $$m = \frac{x_2' - x_1'}{x_2 - x_1} \quad a = \frac{x_2' - mx_2}{(1-m)} \quad b = \frac{y_2' - my_2}{(1-m)}$$

The generalized equation for a rotation in the x,y plane about a center at (a, b) through an angle $\phi$ is $$\begin{bmatrix} \cos\phi & -\sin\phi \\ \sin\phi & \sin\phi \end{bmatrix} \begin{bmatrix} x - a \\ y - b \end{bmatrix} + \begin{bmatrix} a \\ b \end{bmatrix} = \begin{bmatrix} x' \\ y' \end{bmatrix}$$

which can be solved in a similar fashion by substituting in the translation vectors to yield a, b, $\phi$, and so on for the other transformations. The third step is the geometrical transformation of one of the pair of images according to the parameters calculated and the transformation equations given in step 2. Typically, this is achieved using phase-shifting spatial interpolation, similar to the interpolation techniques referenced above, or of the type described in U.S. patent application Ser. No. 08/641,709, entitled "Digital Signal Processing for Implementation of Continuous Zoom With Sub-Pixel Accuracy", assigned to K. R. Hailey and J. C. Loveridge.

Those skilled in the art will recognize that the part or all of the above description of global geometry correction may not be required, depending on the nature of the stereo image display means. For example, displays means utilizing separate left and right images, such as stereo transparency viewers and stereoscope, require little alignment (and often have alignment controls in the display means) whereas a stereo rendering enabled by placing lenticular material over a single image requires careful alignment of the co-printed images.

Having globally aligned the images, a stereo display is possible. In other words, image processing steps in the filter block 126 and in the block 128 need not be performed in order to produce a stereo image rendering of the scene. For example, the digital image representing stereo Element A in block 130 and the digital image representing stereo image element B in block 132 can be subsequently merged into a single digital file which is rendered onto a single piece of output media with image size and image separation consistent with the design of the stereo image viewing means such as a stereoscope.

However, an improved stereo image can be achieved by filtering and combining the two images of the scene. Examples of the types of improvement include improved image signal to noise, color fidelity and the like.

The simplest method by which these improvements can be achieved is to combine the images, for example by means of an average, on a pixelwise basis in areas of the images that are aligned or highly correlated after the global alignment step, block 122. Hence, improved signal to noise can be achieved, but only in the areas of the image pair that are highly cross correlated. However, it is the lack of correlation, resulting from parallax differences in the images that are purposefully separated in distance, that produces the stereo effect.

A more sophisticated approach, which enables improvement in both the correlated and uncorrelated areas of both images of the image pair, is achieved by measuring the local displacements on a pixel by pixel basis, that remain between the images after the global alignment step. The technique employed is similar to that used for the measurement of global displacements, and involves the assignment of a displacement vector obtained, for example, by the phase correlation technique, to each pixel in the image. The resultant array of assigned vectors, which maps the values of each pixel in one image onto the corresponding pixel positions in the second image, is generally referred to as a vector field, and is generated in block 124. In areas of high cross correlation between the pair of images, the assigned vectors will have components equal or close to (0,0). The method is well known and described, for example, in Image Processing, edited by D. Pearson, Chapter 3, "Motion and Motion Estimation," G. Thomas, pp 53–54, McGraw-Hill, 1991.

It will be understood that two vector fields can be generated for the image pair, one which maps the pixel values of the left image onto the right, and the other, the reverse, which maps the right image onto the left.

Figure 6B:
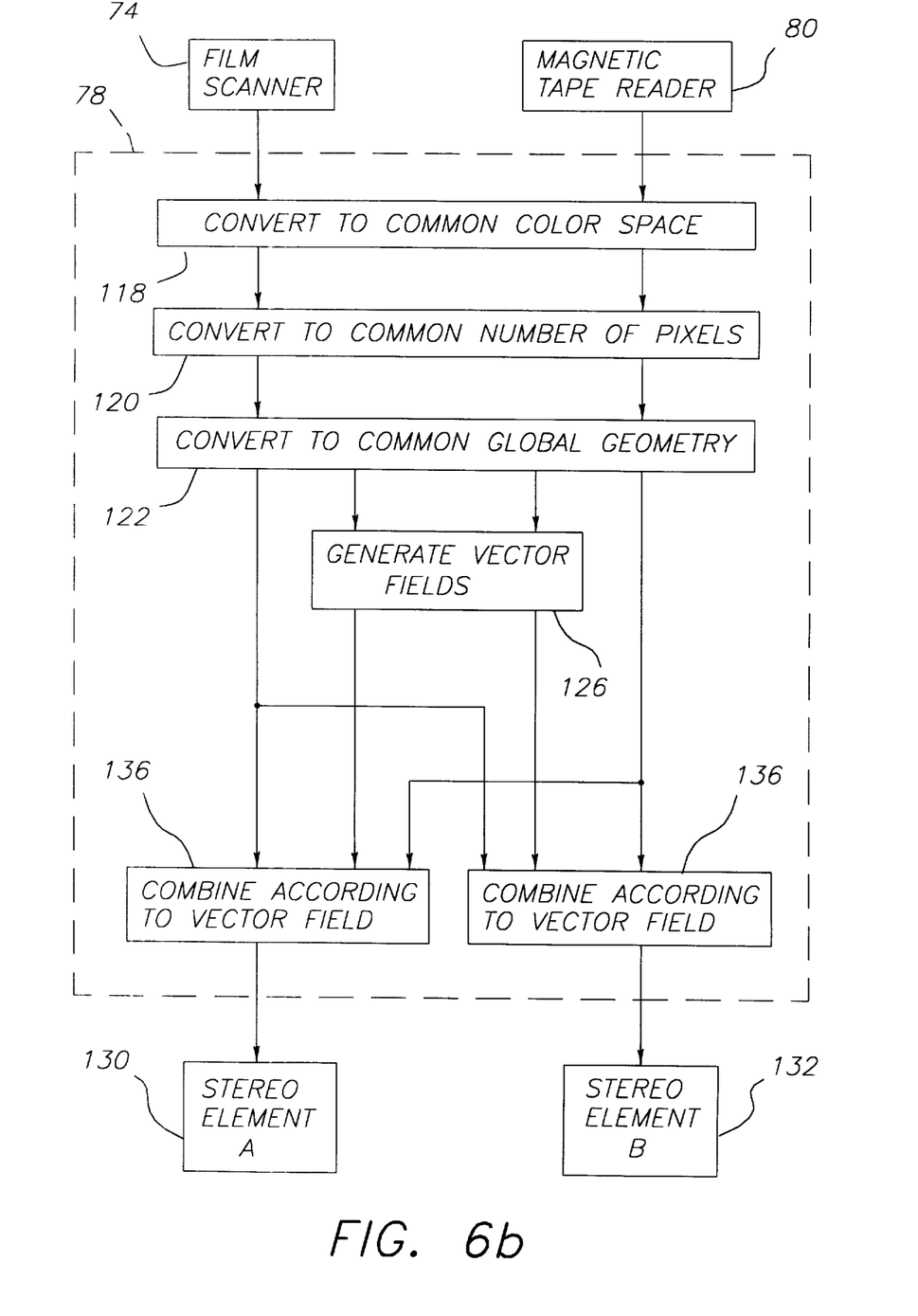
Figure 6C:
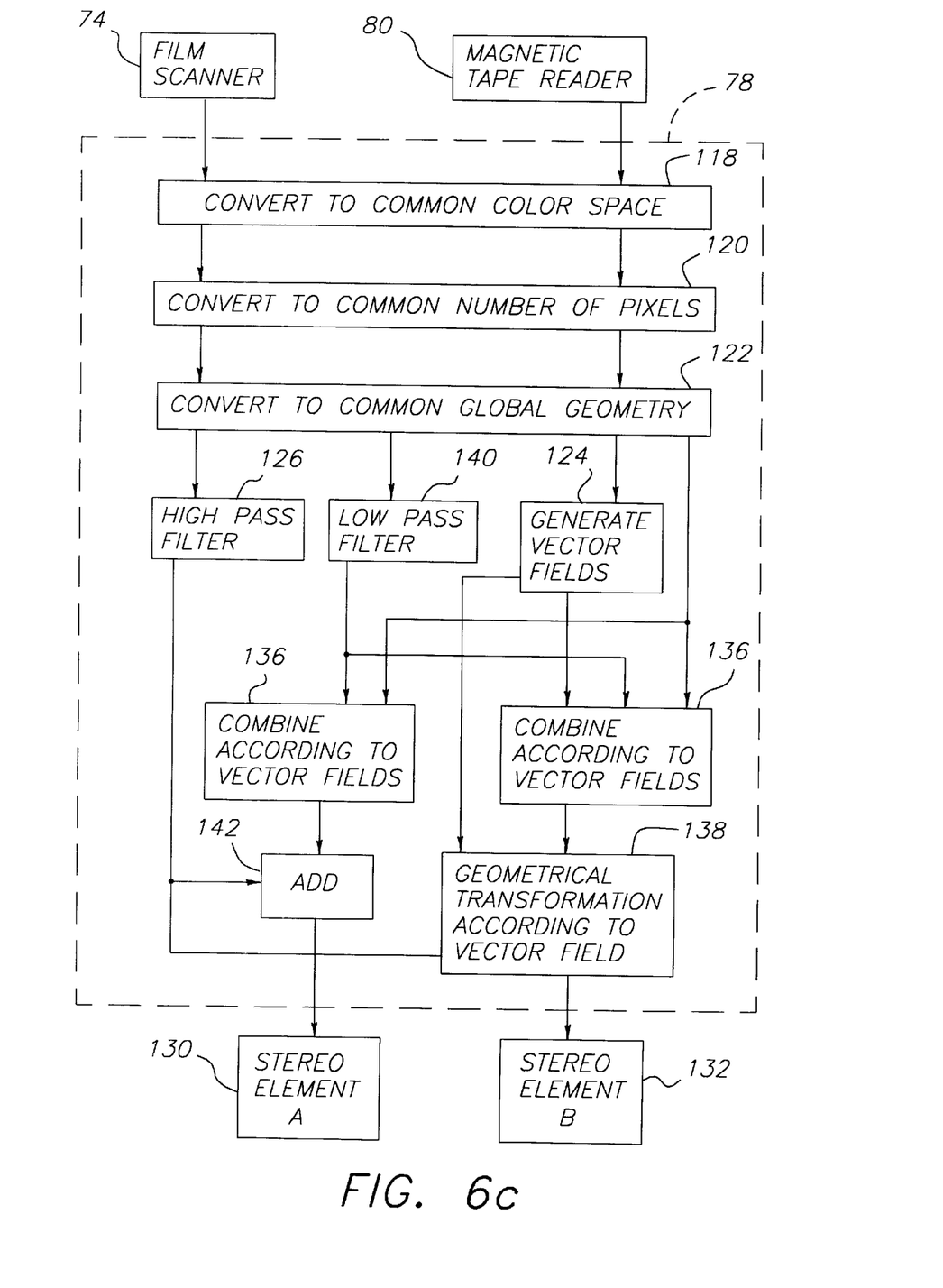
Figure 6D:
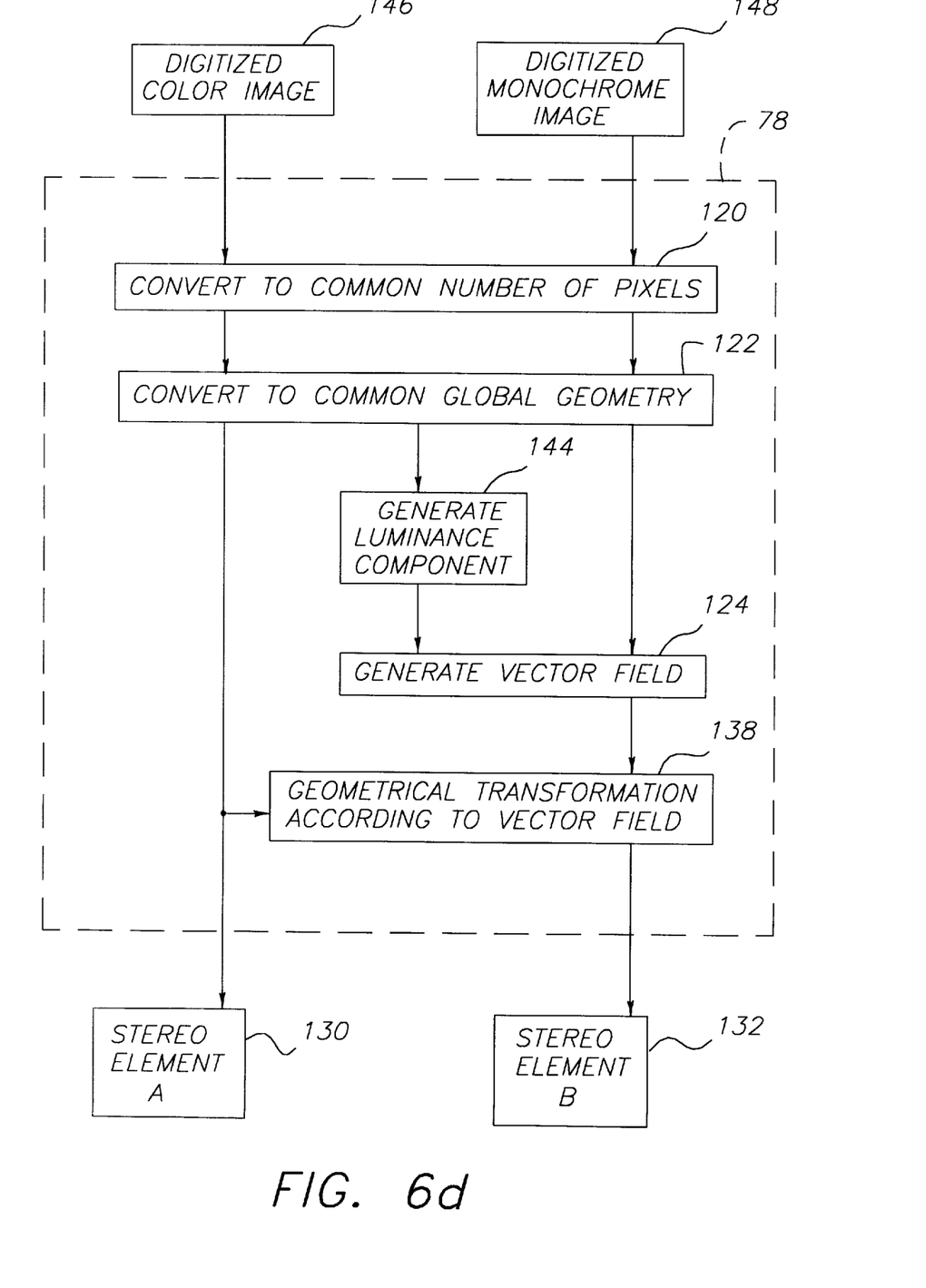

The vector field, or pair of vector fields, can then be employed as follows:

a) the signal to noise ratio (SNR) of each of the images can be improved by generating, in block 124, forward and reverse vector fields between the pair of images, and replacing each image, on a pixel by pixel basis by combining, in block 136, of that image and the corresponding values in the other image, as defined by the appropriate vector field. This is shown in FIG. 6B;

b) in the case where the pair of digitized images originally had a different number of pixels, in FIG. 6C, the image with the higher number of pixels, A, is filtered by a low pass filter, block 140, with frequency response that corresponds to the difference in the effective frequency responses of the two images. The low pass filter can be designed using well known techniques (as described, for example, in Chapter 3 of "Theory and Application of Digital Signal Processing," Rabiner & Gold, Prentice-Hall, 1975). A vector field is generated in block 124 to map this low pass filtered image, A, onto the other, up-interpolated image, B. The up-interpolated image is replaced by combination, on a pixel by pixel basis, of the up-interpolated image and the corresponding values in the low pass filtered image, as defined by the vector field. Similarly, the low pass filtered image is replaced by combining the low pass filtered image and the corresponding values in the up-interpolated image, as defined by the reverse vector field. In block 126, a high pass filter, with frequency response complementary to the above mentioned low pass filter, is convolved with image A, to obtain a high pass filtered version of image A, in block 130. The low and high pass filtered versions of A are added together in block 142 to obtain a full band image A with improved SNR at low and mid spatial frequencies. The high pass filtered version of A is then geometrically transformed, according to the forward vector field in block 138, to provide a high frequency signal which is added to the up-interpolated image B to provide a full band image B, block 132, with improved SNR at low and mid spatial frequencies, and improved high frequency response, but which still contains the parallax information required for the stereo effect It will be understood that although the above description relates to the digitized image with the higher number of pixels originating from the film scanner 74, the method may be easily adapted for the case where the digitized image with the higher number of pixels originates from the magnetic tape reader 80; and c) in the case where one of the images is color and the other monochrome, as shown in FIG. 6D, a vector field is generated in block 124 to map the luminance component 144 of the image values in the color image onto the corresponding values in the monochrome image. It will be understood that the digitized color image 146 or the digitized monochrome image 148 could be derived from either the film scanner 74 or magnetic tape reader 80. A second color image, which contains the parallax information required for the stereo effect, is obtained in block 138 by geometrically transforming the first color image according to the vector field.

Although the invention has been described with reference to image capture media which include photographic film and an image sensor, it will be understood to those skilled in the art that two or more image sensors can be used as the image capture media. Alternatively, the two capture media can be provided by two separate images on photographic film.

The invention has been described in detail with particular reference to a certain preferred embodiment thereof, but it will be understood that variations and modifications can be effected within the spirit and scope of the invention. For example, images can be directly exposed onto the electronic image sensor 25 without any film cartridge 22 being inserted into the cartridge receiving structure 31 and, in such a case, the camera would operate as a conventional electronic camera with the exception that the stored images could be transferred onto a magnetic tape of a film cartridge 22 after such cartridge is inserted into the camera.

| PARTS LIST | | |
|---|---|---|
| A | apertures | |
| B | apertures | |
| C1 | data tracks | |
| C2 | data tracks | |
| 1 | hybrid camera main body | |
| 3a | camera lens | |
| 3b | camera lens | |
| 6 | focusing mechanisms | |
| 7 | shutter switch | |
| 8 | wind-up lever | |
| 9 | shutter speed dial | |
| 10 | film rewind knob | |
| 12 | film sensitivity dial | |
| 16 | reflex mirror | |
| 18 | submirror | |
| 20 | film | |
| 22 | film cartridge | |
| 25 | electronic image sensor | |
| 26 | printed circuit board | |
| 27 | semiconductor chip | |
| 28 | rear covers | |
| 29 | rear covers | |
| 30 | photographic film plane | |
| 31 | cartridge receiving structure | |
| 32 | control circuit | |
| 33 | image storage temporary memory | |
| 34 | temporary external memory | |
| 34a | shutter mechanism | |
| 34b | shutter mechanism | |
| 36 | linear magnetic head array | |
| 38 | magnetic head | |
| 40 | head interface electronics | |
| 41 | keyboard | |
| 42 | display interface electronics | |
| 43 | input/output device | |
| 44 | display controller | |
| 46 | display device | |
| 47 | power supply | |
| 48 | microprocessor | |
| 50 | motor drive | |
| 51 | internal spool | |
| 52 | take-up spool | |
| 54 | arrow | |
| 55 | image frame | |
| 56 | arrow | |
| 60 | detector circuit | |
| 62 | opto-sensor | |
| 64 | opto-sensor | |
| 66 | head drive | |
| 74 | film scanner | |
| 76 | photographic film | |
| 78 | central processing unit | |
| 80 | magnetic tape reader | |
| 82 | digital hard copy output printer | |
| *-continued* | | |
| PARTS LIST | | |
| 100 | timing generator | |
| 102 | CCD drivers | |
| 104 | address generator | |
| 106 | analog-to-digital converter | |
| 108 | digital-to-analog converter | |
| 110 | signal processing circuitry | |
| 112 | analog signal processing circuitry | |
| 116 | data bus | |
| 118 | block to convert to common color space | |
| 120 | block to convert to common number of pixels | |
| 122 | block to convert to common global geometry | |
| 124 | block | |
| 126 | block | |
| 128 | block | |
| 130 | block | |
| 132 | block | |
| 136 | block | |
| 138 | block | |
| 142 | block | |
| 144 | luminance component | |
| 146 | digitized color image | |
| 148 | digitized monochrome image | |

What is claimed is:

1. A method of making a stereoscopic image of a scene, comprising:

providing a camera having an image sensor for capturing the first image of the scene and a photosensitive medium for capturing a second image of the scene, wherein the second image of the scene is captured from a viewpoint displaced in position from the viewpoint from where the first image was captured;

allowing a user to provide an indication to a photofinisher as to which images are to be produced as stereoscopic images;

digitizing both the first and second images;

converting both the first and second digitized images to a common color space;

converting both the first and second digitized images to a common number of pixels;

generating forward and reverse vector fields which define the spatial displacements between the digitized images that are due to parallax, and employing these vector fields to generate a pair of digitized images, both of which have improved characteristics, and which maintain the stereoscopic information; and producing visual images of the first and second separate capture digital images which, to a viewer, provides a stereoscopic image of the scene.

\* \* \* \* \*